United States Patent [19]

Cornell

[11] 4,010,767
[45] Mar. 8, 1977

[54] FUEL SUPPLY AND DISTRIBUTION SYSTEM

[75] Inventor: Richard Henry Cornell, Marblehead, Mass.

[73] Assignee: General Electric Company, Lynn, Mass.

[22] Filed: Oct. 31, 1975

[21] Appl. No.: 627,728

Related U.S. Application Data

[62] Division of Ser. No. 487,888, July 12, 1974, Pat. No. 3,949,775.

[52] U.S. Cl. .............................. 137/118; 137/83; 91/3
[51] Int. Cl.² ..................................... G05D 11/00
[58] Field of Search ............... 137/118, 609, 83; 60/39.74 R, 39.37, 39.74 B; 239/551, 562, 563; 431/89; 91/3

[56] References Cited

UNITED STATES PATENTS

| | | | |
|---|---|---|---|
| 1,177,480 | 3/1916 | Callan | 137/118 |
| 2,083,046 | 6/1937 | Burke | 137/118 |
| 2,377,300 | 5/1945 | Pray | 91/3 |
| 2,685,334 | 8/1954 | Davies | 239/562 |
| 2,701,609 | 2/1955 | Thorpe et al. | 137/118 |
| 2,993,338 | 7/1961 | Wilsted | 60/39.74 R |
| 3,147,594 | 9/1964 | Hill et al. | 60/39.74 R |
| 3,310,286 | 3/1967 | Ifield | 91/3 |
| 3,362,296 | 1/1968 | Gray | 91/3 |
| 3,411,291 | 11/1968 | Tyler | 137/118 |
| 3,587,231 | 6/1971 | Fisher et al. | 60/39.28 R |

Primary Examiner—William R. Cline
Assistant Examiner—H. Jay Spiegel
Attorney, Agent, or Firm—James W. Johnson, Jr.; Derek P. Lawrence

[57] ABSTRACT

A fuel supply and distribution system is provided for a gas turbine engine wherein a plurality of flow dividing valves disposed about a manifold are positively controlled through an actuator which interconnects the flow dividing valves by linkage means extending through the manifold thus preventing sticking or seizing of the pressure regulating valves on account of contaminant particulate matter in the fuel.

2 Claims, 9 Drawing Figures

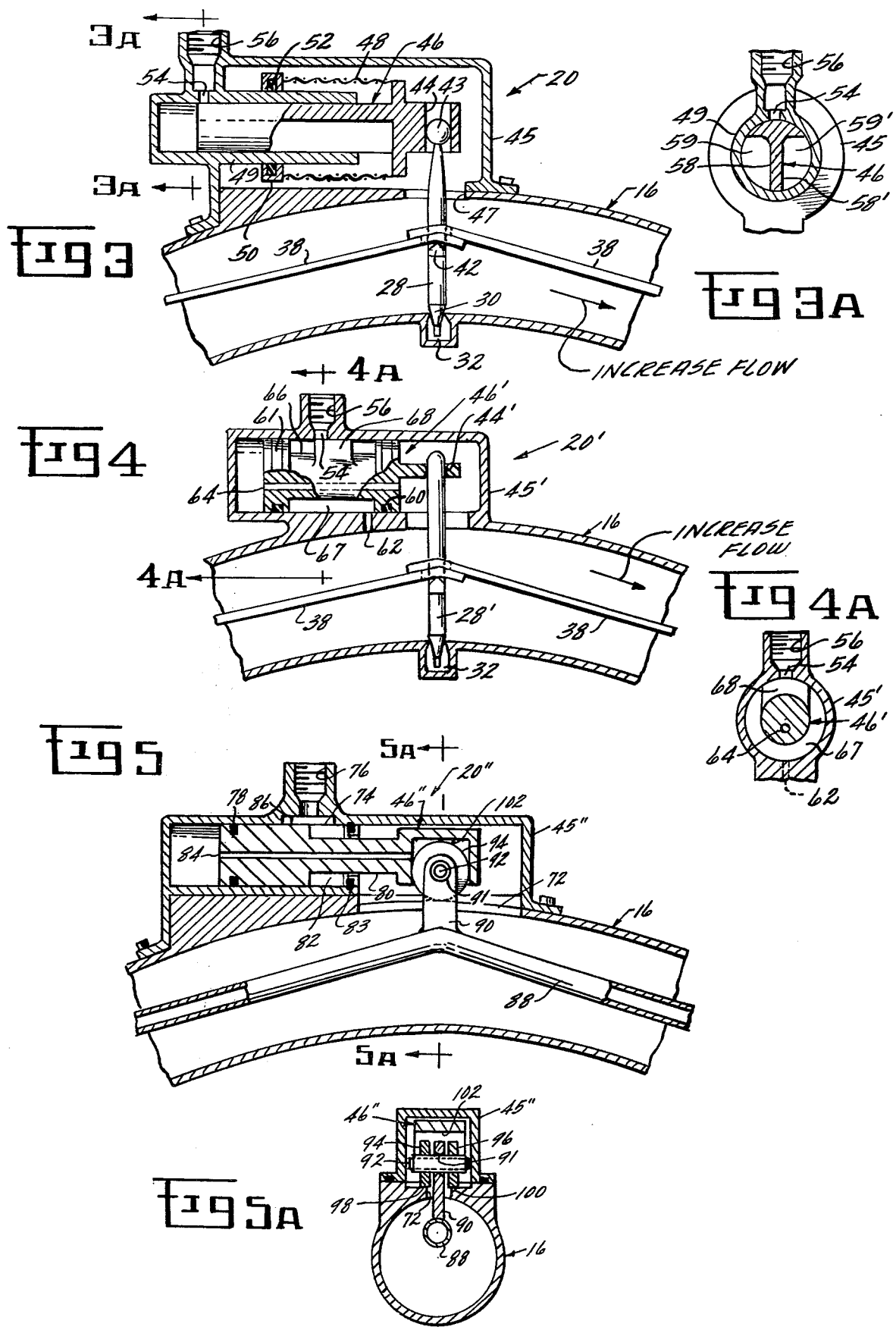

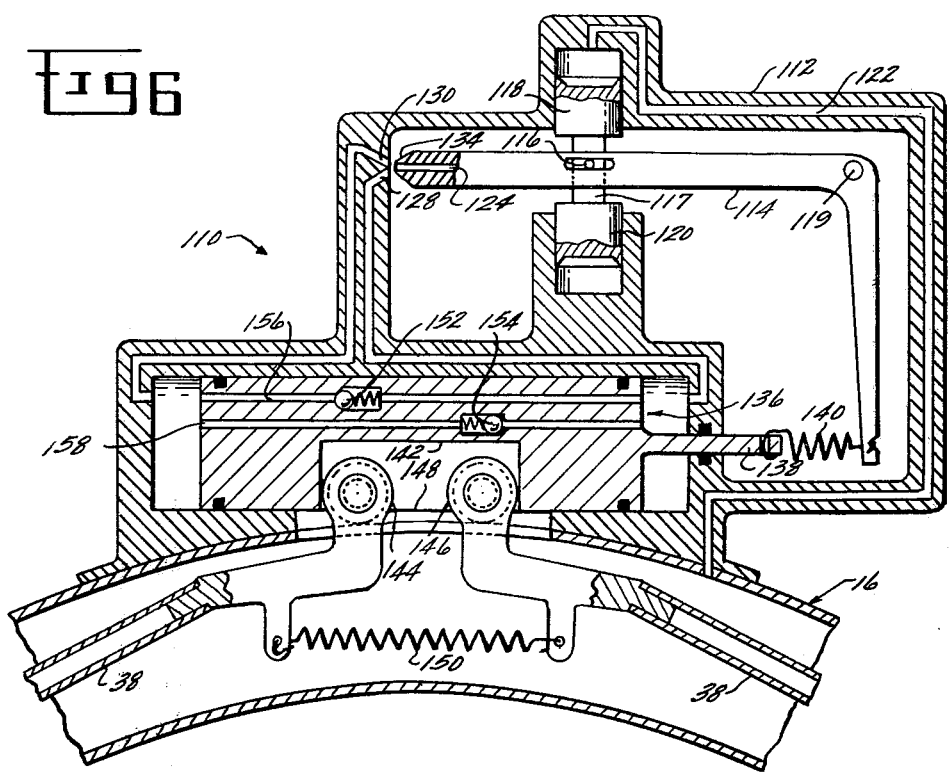

FUEL SUPPLY AND DISTRIBUTION SYSTEM

This application is a divisional of application Ser. No. 487,888, filed July 12, 1974 and now U.S. Pat. No. 3,949,775.

BACKGROUND OF THE INVENTION

This invention relates to a fuel supply and distribution system and more particularly, to a fuel supply and distribution system for a gas turbine engine wherein a plurality of flow dividing valves are positively actuated in a manner which precludes sticking or seizure on account of contaminant particulate matter in fuel.

In a gas turbine engine, fuel is generally supplied to a combustor by a plurality of fuel injectors which receive a regulated flow of fuel from an interconnecting manifold. Between the manifold and each fuel injector, there is generally provided a flow dividing valve which operates to establish a minimum pressure within the manifold before the fuel will initially flow to the injectors. After fuel flow is initiated through the injectors, each flow dividing valve operates to maintain the same flow versus pressure drop characteristic. Thus the flow dividing valves insure that each fuel injector receives the same rate of fuel flow in order to uniformly distribute fuel around the engine combustor.

The flow dividing valves are generally relief valves with the same flow versus pressure drop characteristic wherein each valve has a precise metering window which cooperates with a spring actuated metering piston to accurately schedule fuel flow for a particular pressure drop. Because of the close diametral fit of the metering piston (normally 0.005 inch or less), this type of valve is highly susceptible to sticking or seizure due to contaminant particulate matter in the fuel lodging between the moving valve surfaces.

Because of the small size of the contaminant particulate matter which can cause the valve to stick, any filter suitable to block such contaminants would either incur too great a pressure drop or would be too large in size to be practical. Thus replacement of such valves due to sticking has become a common field complaint. Military specifications also now require all fuel system components to be able to pass a contaminated fuel test.

Therefore it is a primary object of this invention to provide a fuel supply and distribution system which can pass contaminated fuel without valves sticking or seizing.

It is also an object of this invention to provide a fuel supply and distribution system for a gas turbine engine wherein a plurality of flow dividing valves are positively actuated in a manner which precludes sticking or seizure on account of contaminant particulate matter in the fuel.

SUMMARY OF THE INVENTION

These and other objects and advantages will be more closely understood from the following detailed description and drawings, all of which are intended to be representative of, rather than in any way limiting on, the scope of the invention. The fuel supply and distribution system of this invention includes a manifold tube which receives a flow of pressurized fuel. There is also included an actuator of the type having a piston slidably disposed therein, one side of which is pressurized by the fuel flow from the manifold tube. A plurality of flow dividing valves are disposed about the manifold ring wherein each valve includes a metering piston translatably disposed therein for regulating the flow of fuel from the manifold tube. Linkage means extend through the manifold tube and interconnect the actuator with the flow dividing valves such that movement of the actuator piston is simultaneously imparted to the flow dividing valve pistons.

BRIEF DESCRIPTION OF THE DRAWINGS

The invention may be better understood upon reading the following description of the preferred embodiment in conjunction with the accompanying drawings.

FIG. 3 shows an enlarged cross-sectional view of a flow dividing valve of the fuel supply and distribution system of FIG. 1.

FIG. 3A shows a cross-sectional view taken across the lines 3A—3A of FIG. 3.

FIG. 4 shows a cross-sectional view of an alternate embodiment of the flow dividing valve of FIG. 3.

FIG. 4A shows a cross-sectional view taken across the lines 4A—4A of FIG. 4.

FIG. 5 shows a cross-sectional view of still another embodiment of the flow dividing valve of FIG. 3.

FIG. 5A shows a cross-sectional view taken across the lines 5A—5A of FIG. 5.

FIG. 6 shows a cross-sectional view of an alternate embodiment of the actuator of FIG. 1.

DESCRIPTION OF THE PREFERRED EMBODIMENT

Figure 1:
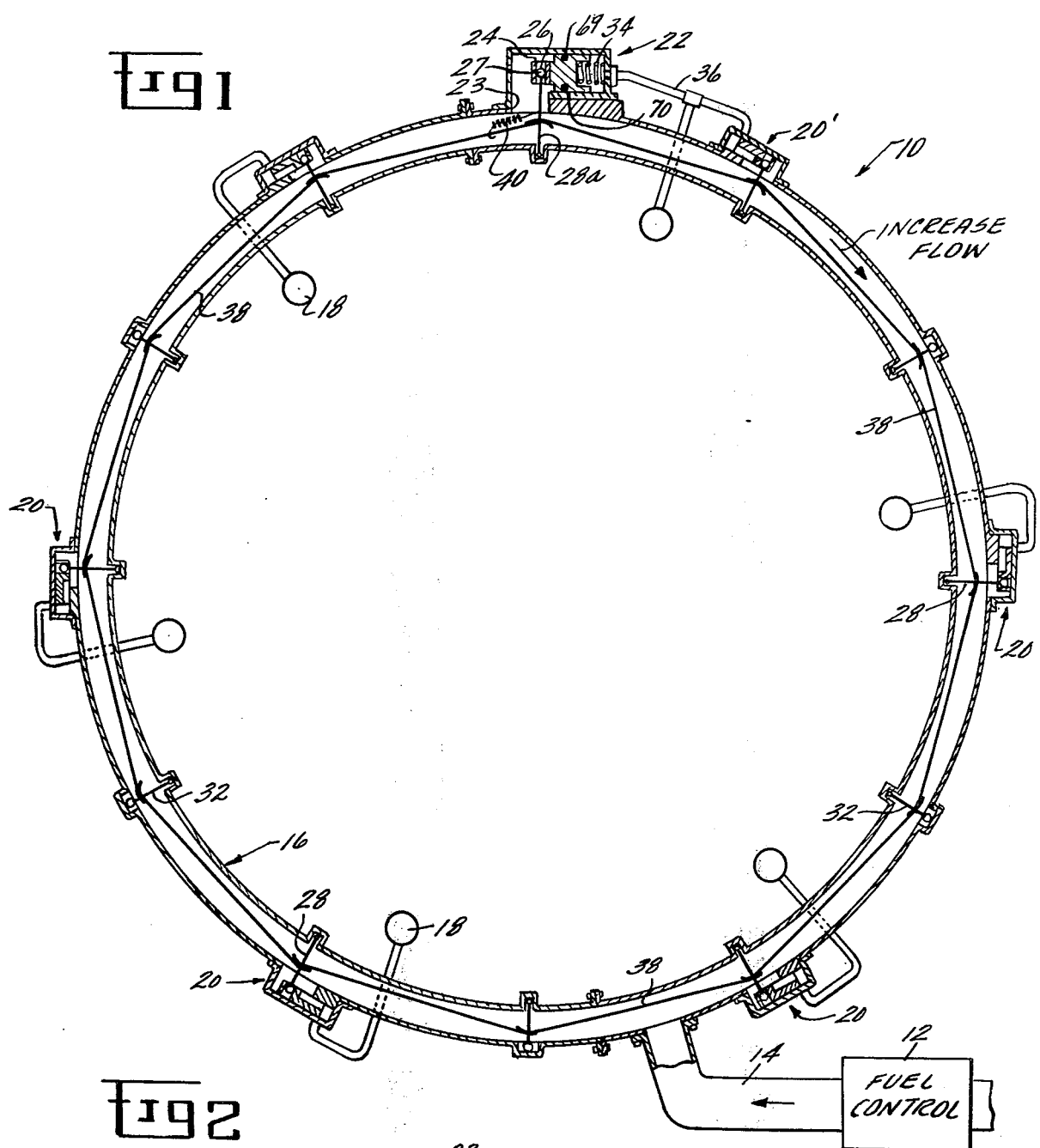
FIG. 1 shows a cross-sectional view of the fuel supply and distribution system of this invention.

Referring to FIG. 1, there is shown a fuel supply and distribution system 10 having a manifold tube 16 which receives a metered and regulated flow of fuel from a fuel control 12 by way of an interconnecting conduit 14. The fuel control 12 receives a flow of pressurized fuel from a source (not shown). The manifold tube 16 branches into a plurality of circumferentially spaced apart fuel injectors 18 which furnish fuel to a burner or burners or the equivalent (not shown) as may be found in a gas turbine engine of the kind comprising a compressor, which supplies air to a combustion system within which liquid fuel is burned. The resultant energized gaseous mixture drives a gas turbine of which a part of the whole shaft power output is used to drive the compressor while a residual energy of the exhaust gases is utilized to produce propulsive thrust. The fuel injectors 18 are mounted around the burner which may be either a main combustor or an afterburner and may be either of the flow tube type as is utilized in conventional vaporizing combustion systems, or the spray nozzle type as is utilized in conventional atomizing combustion systems, or the spray bar type as is utilized in conventional afterburning combustion systems. The individual spaced apart fuel injectors 18 respectively receive the flow of pressurized fuel from a plurality of circumferentially spaced apart flow dividing metering valves 20 which operate to determine the minimum pressures at which fuel will initially flow while also insuring that each fuel injector receives the same rate of fuel flow.

Figure 2:
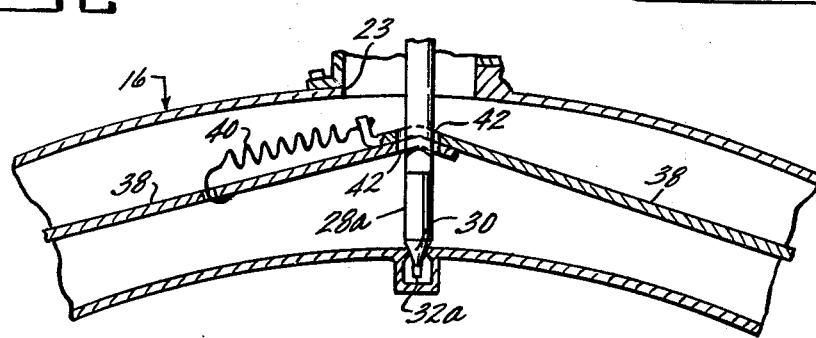
FIG. 2 shows an enlarged cross-sectional view of a portion of the fuel supply and distribution system of FIG. 1.

An actuator 22 connects to the manifold ring 16 and includes an actuator piston 24 slidably disposed therein such that the high pressure fuel from the manifold tube 16 enters the actuator through an inlet 23 and pressurizes one side of the actuator piston 24. The flow of pressurized fuel past the piston 24 is prevented by an O-ring seal 69 together with a low friction cap seal 70. The opposing side of the actuator piston 24 is biased by a compression spring 34 and may also receive the low pressure outlet fuel from the flow dividing valve 20' through conduit 36. The high pressure side of the actuator piston 24 includes a radially extending track 26 which slidably engages a ball 27 integrally connected to the outer radial end of a pivot arm 28a. The track 26 may be any slot or opening suitably sized to guide the ball 27. The inner radial end of the pivot arm 28a is tapered at 30 (as best shown in FIG. 2) so as to pivotally engage the manifold tube 16 at a receptacle 32a in the side of the manifold.

There is also provided a plurality of circumferentially spaced apart pivot arms 32 disposed around the manifold tube 16 so as to also pivotally engage spaced apart receptacles 32a in the aforementioned manner. The outer radial ends of every other pivot arm 32 engage a respective flow dividing valve 20 in a manner to be fully described by the following discussion in regard to FIG. 3. The pivot arms 28 and 28a are interconnected by a plurality of circumferentially spaced apart links 38 which engage the pivot arms through eyelets 42 as best seen in FIG. 2. There is also included a tension spring 40 to keep the links 38 under continuous tension wherein the clearances provided between the eyelets 42 and the actuator pivot arm 28a are such that the actuator pivot arm 28a always operates to pull a corresponding linkage. As is readily apparent, the spring 40 and the clearances between the actuator pivot arm 28a and the eyelets 42 also prevent looseness and binding in the linkage system as it is moved by the actuator 22 in a manner to be made more obvious from the following discussion.

Referring now to FIG. 3, there is shown the flow dividing valve 20 as including a housing 45 within which a metering piston 46 is translatably disposed relative to a sleeve 49 formed integral to the housing 45. A flow of pressurized fuel enters the housing 45 from the manifold tube 16 through an inlet 47 whereupon the fuel flows through a filter screen 48 which is attached to the metering piston 46 for translation therewith. The filter screen 48 translatably and sealingly engages the outer surface of the sleeve 49 by means of a low friction cap seal 50 together with an O-ring seal 52. The high pressure side of the metering piston 46 also includes a track 44 within which is translatably and pivotally disposed a ball 43 integrally connecting the outer radial end of the pivot arm 28. The metering piston 46 cooperates with a metering window 54 in the housing 45 so as to accurately schedule the flow of fuel through the flow dividing valve 20 and thereby cause a predetermined pressure drop. The metered and regulated fuel flow thereupon exists from the valve 20 through an outlet port 56 which is in flow communication with a respective fuel injector 18. As may be readily appreciated by referring to FIG. 3a, surfaces 58, 58' of the metering piston 46 have been relieved to define plenums 59, 59' through which the flow of pressurized fuel is directed to the metering window 54. Thus the fuel pressure is equalized on both ends of the piston 46 with no net force acting on the piston other than that applied by the pivot arm 28. The relieved surfaces of the metering piston 46 also operate to protect the moving surfaces of the valve against sticking and seizure from contaminating particulate matter as fully described in U.S. Pat. No. 3,765,447 assigned to the instant assignee.

During operation, when there is an increase in fuel flow from the fuel control 12, the pressure of the fuel within the manifold tube 16 also increases and operates against the high pressure side of the actuator piston 24. In response to the increased fuel pressure, the actuator piston 24 translates in the direction of spring 34 compression so as to rotate the pivot actuator arm 28a in a clockwise direction about the receptacle 32a. The connecting links 38 are then pulled around the manifold ring 16 in a clockwise direction so as to rotate the remaining pivot arms 28 in a clockwise direction about their respective receptacles 32a. In this manner, the individual metering pistons 46 are translated to the right by the coaction of the balls 43 within their respective tracks 44. Thus the metering windows 54 are opened and effect a change of the fuel pressure within the manifold as determined by the area of the actuator piston 24 and the force of the spring 34.

Again it should be fully appreciated that due to the clearances between the eyelets at the end of the individual connecting links 38 and their respective pivot arms 28 and 28a, the connecting links are always pulled, thus ameliorating the effects of any tendency for the individual links to flex. Also, whereas the interconnecting links 38 remain immersed in fuel, thermal growth of the links 38 will be substantially the same as that of the manifold ring 16 assuming near equal coefficients of expansion, thus maintaining the positional accuracy of the links 38 for various temperatures.

In this manner, the increased fuel pressure operates on the actuator 22 to provide a mechanical driving force by way of the interconnecting links 38 to the individual flow dividing valves 20, thus reducing the potential for an individual flow dividing valve to stick due to contaminated particulate matter lodging between the moving parts thereof. Because the pressurized fuel flow from the manifold tube is not metered by the actuator 22, there is little risk of contaminating particulate matter lodging between the moving surfaces of the actuator so as to jam the actuator piston 24. In addition, the cap seal 70 and O-ring seal 69 also cooperate to prevent the introduction of particulate matter between the actuator moving surfaces. As will be readily appreciated, the system establishes a pressure differential across the flow dividing valves 10 wherein the difference in pressure between the manifold and fuel injectors is a function of the area of the actuator piston 24 and the force of the spring 34.

Referring now to FIGS. 4 and 4A, there is shown an alternate embodiment for the flow dividing metering valve 20' wherein the valve housing 45' includes a metering piston 46' translatably disposed therein and having cap seals and O-rings 60, 61 at opposing ends thereof. The surfaces of the metering piston 46' are relieved at 66 in the areas intermediate the O-rings and cap seals 60, 61 so as to define an annular plenum 67 between the piston and the valve housing. The plenum 67 receives the flow of pressurized fuel from the manifold tube 16 through an inlet conduit 62 whereupon the flow of fuel is subsequently regulated by the coaction between a land 68 extending from the piston 46' and the metering window 54 in the housing 45'. Pressurized fuel is conducted through the piston 46' by a conduit 64 in order to equalize pressure on both sides thereof, thus eliminating any net force on the piston other than that provided by the pivot arm 28' and the drag of seals 60 and 61. Fuel thereafter exits from the valve 20' through an outlet port 56 whereupon it is directed to a respective fuel ejector 18. When the fuel flow into the manifold tube 16 is shut down by the fuel control 12, the pivot arm 28' will rotate slightly counter-clockwise driving the O-ring and cap seal 60 into overlapping relation with the inlet port 62 in order to prevent the manifold tube from draining. In this manner the manifold will be kept full at all times so as to reduce the time required to fill the manifold during the next startup. Thus the fuel supply distribution system 10 determines the minimum pressures at which fuel will flow to the individual fuel distributors and also operates to keep the manifold and conduits full during shutdown so as to keep the startup times at a minimum which may be particularly critical for military aircraft.

Referring now to FIGS. 5 and 5A, there is shown still another embodiment for the flow dividing valve 20" wherein the valve housing 45" includes a metering piston 46" translatably disposed therein. A cap seal and O-ring 78 are provided near one end of the metering piston 46" for sealingly engaging the valve housing 45" during piston translation. The surface intermediate the ends of the metering piston 46" is relieved at 80 so as to define an annular plenum 82 between the piston and valve housing. In addition, there is also provided an axially extending passageway 84 through the piston 46" so that fuel entering the valve housing 45" through an inlet 72 is directed through the passageway 84 to both ends of the piston 46". In this manner, the fuel pressure on both sides of the piston 46" is equalized so as not to load the piston in either direction. The flow of pressurized fuel from the valve 20" is then regulated by the coaction between a land 86 at one end of the piston 46" and a metering window 74 in the valve housing 45". Fuel thereafter exits from the valve 20" through an outlet port 76 whereupon it is directed to a respective fuel ejector 18. Fuel flow from the valve 20" may be entirely shut off by translating the radial edge of land 86 into abutting engagement with a seal 83 which extends around the inside of the housing 45".

Translation of the piston 46" is controlled in the following manner. The pivot arms 28 and links 38 are replaced by a tubular linkage 88 which may be in the form of two semicircular pieces extending around the manifold 16 and interconnected at one end by nuts and bolts (not shown). The linkage 88 includes a radially extending flange 90 which may be welded or otherwise attached to the linkage 88 for circumferential movement therewith.

The flange 90 includes a bore 91 at the outside end thereof, through which a pin 92 extends for rotatable engagement with the flange 90. The pin 92 operates as an axle interconnecting at its opposing ends two roller or ball bearings 94, 96. The bearings 94, 96 in turn respectively ride along spaced apart circumferential tracks 98, 100 which are integrally connected to the valve housing 45". The roller bearings 94, 96 seat within a transverse slot in the piston 46" so as to convert circumferential motion of the tubular linkage 88 into linear translation of the piston 46". The tubular linkage 88 can be maintained in tension in the previously described manner by a spring as shown in FIG. 1 wherein the spring interconnects the nonconnected ends of the semicircular sections of the tubular linkage 88. The tubular linkage 88 is also circumferentially rotated within the manifold 16 by the actuator 22 in the above described manner.

As is readily apparent, the bore 91 in the flange 90 may be bevelled or relieved to permit slight misalignments of the pin 92 without disturbing the close fit between the flange 90 and pin 92.

Referring now to FIG. 6 there is shown an alternate embodiment for the actuator 110 comprising a housing 112 within which a bell crank type of jet pipe servo 114 is pivotally connected to the housing at 119. The jet pipe 114 is also rotatably and slidably pinned at 116 to a rod 117 interconnecting two spaced apart pistons 118, 120, both of which are disposed for translation within the housing 112. The head side of piston 118 is pressurized by a flow of fuel received from the manifold 16 by way of an interconnecting conduit 122 while the head side of piston 120 is pressurized by the gaseous mixture from the combustor.

The jet pipe 114 receives a flow of pressurized servo fluid from a source (not shown) whereupon the servo fluid is directed through a conduit 124 and ejected through a nozzle 134 in a conventional manner as is well known in the servo art. When the jet pipe 114 is spaced equidistant from a pair of spaced apart receiver passages 128, 130, the servo fluid is then directed in equal portions to the receiver passages from whence it pressurizes opposing ends of an actuator piston 136. The actuator piston is disposed for translation within the valve housing 112 and includes a rod 138 extending axially therefrom for resilient feedback connection to the end of the bell crank type jet pipe 114. Resilient connection between the rod 138 and bell crank pipe 114 is provided by a spring 140.

The actuator piston 136 includes a transverse slot 142 wherein the opposing ends of the slot respectively engage rollers 144, 146. Each roller in turn is rotatably pinned to an end of a circumferential link 38 and rotatably engages a circumferential track 148 formed integral to the valve housing 112. The ends of the links 38 are connected by a tension spring 150 to keep the links under continuous tension as previously described.

During steady state operation, the actuator 110 and servo pipe 114 balance at a particular fuel flow and manifold pressure condition so that the servo fluid is divided in equal proportions between the receiver passages 128, 130. This in turn equalizes the pressure at the opposing ends of the actuator piston 136 and maintains the piston 136, links 38 and metering valves in place.

If the fuel control 12 should schedule a higher fuel flow, then the pressure of the fuel in the manifold will start to increase. The increased manifold fuel pressure will then be transmitted to the head side of piston 118 by way of conduit 122 whereupon the pistons 118, 120 will start to translate downwardly rotating the jet pipe 114 in a counter-clockwise direction about the pivot 119. Receiver passage 128 will then receive an increased proportion of the servo fluid so as to increase the pressure on the right hand side of the actuator piston 136 and thus translate the actuator piston to the left. The actuator piston 136 then engages the roller 146 which in turn pulls the connecting links 38 about the manifold ring 16 in a counter-clockwise direction so as to open the metering valves in the aforementioned manner.

Translation of the actuator piston 136 also operates to stretch the spring 140 so as to impose a clockwise torque on the bell crank jet pipe 114. The jet pipe will then slowly return to the equidistant position so that each receiver passage 128, 130 will again receive an equal portion of servo fluid and thus balance the pressure at opposing ends of the actuator piston 136 so as to stop translation thereof. The actuator piston 136 may include longitudinal passages 156, 158 therethrough together with respective check valves 152, 154 which together operate to limit the pressure differential across the piston 136 and thus prevent damage to the links or pressure regulating valves. Should the fuel control 12 schedule a decreased fuel flow, then the above described process would be conducted in the opposing mode with the actuator piston 136 translating to the right.

In this manner the manifold fuel pressure is not required to provide the operating force for the actuator and a high pressure and force always remain available to operate the actuator even when the fuel flow rates and pressures within the manifold are low. At high fuel flow the manifold pressure may also be kept low to reduce the maximum pressure drop within the fuel system and thus reduce the horsepower and weight of the fuel pumps (not shown) and controls 12 upstream of the fuel manifold. The actuator 110 is particularly useful with contaminated fuel where the servo fluid may be finely filtered fuel, the condition of which may be maintained independent from the contaminated fuel flow in the manifold.

Accordingly, while preferred embodiments of the present invention have been depicted and described, it will be appreciated by those skilled in the art that many modifications, substitutions and changes may be made thereto without departing from the invention's fundamental theme.

What is claimed is:
1. A fuel supply and distribution system comprising:
an annular manifold tube for receiving a flow of pressurized fuel,
an actuator having a piston slidably disposed therein wherein the piston is actuated in response to changes in the pressure of the fuel in the manifold tube,
a plurality of flow dividing valves disposed about the circumference of the manifold tube each including a metering piston translatably disposed therein for regulating the flow of fuel from the manifold tube,
linkage means extending through the manifold tube interconnecting the actuator with the flow dividing valves such that movement of the actuator piston is simultaneously imparted to the flow dividing valve pistons,
wherein the actuator includes servo means controlled by the pressure of the manifold fuel in a manner which unbalances the pressure of a servo fluid at opposing ends of the actuator piston and thus translates the actuator piston as a function of changes in the manifold fuel pressure, and feedback means for returning the servo means to the balanced condition in order to stop translation of the actuator piston,
wherein the servo means includes a bell crank type jet pipe servo rotatably disposed with respect to the actuator for discharging a jet of pressurized servo fluid wherein rotation of the jet pipe is controlled by rotatable and sliding engagement to a rod interconnecting two spaced apart pistons both of which are disposed for translation relative to the actuator with the head side of one piston pressurized by fuel received from the manifold and the head side of the other piston pressurized by the gaseous mixture from the combustor, and further includes spaced apart receiver passages for receiving the servo fluid from the jet pipe and directing it to pressurize opposing sides of the actuator piston;
and wherein the feedback means includes a resilient connection between the actuator piston and jet pipe so as to impart a torque to the jet pipe servo counter to that imposed by a change in fuel manifold pressure.

2. The fuel supply and distribution system of claim 1 for furnishing fuel to a combustor wherein:
the feedback means includes a spring interconnecting the actuator piston with the bell crank jet pipe so as to impart a torque to the jet pipe counter to that imposed by a change in fuel manifold pressure relative to combustor pressure; and
the actuator piston includes: a transverse slot, the opposing ends of which respectively engage rollers which are rotatably pinned to the linkage means, and longitudinal passages extending through the actuator piston which together with respective check valves operate to limit the pressure differential across the actuator piston.

* * * * *